United States Patent
Hao et al.

(10) Patent No.: US 8,935,374 B2
(45) Date of Patent: Jan. 13, 2015

(54) METHOD, SYSTEM, AND DEVICE FOR REALIZING REGISTRATION MECHANISM OF IP MULTIMEDIA SUBSYSTEM

(75) Inventors: Zhenwu Hao, Shenzhen (CN); Baoguo Xie, Shenzhen (CN); Shilin You, Shenzhen (CN); Zhendong Li, Shenzhen (CN); Changle Zou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 975 days.

(21) Appl. No.: 13/058,728

(22) PCT Filed: Jul. 9, 2009

(86) PCT No.: PCT/CN2009/072704
§ 371 (c)(1),
(2), (4) Date: Feb. 11, 2011

(87) PCT Pub. No.: WO2010/017730
PCT Pub. Date: Feb. 18, 2010

(65) Prior Publication Data
US 2011/0145388 A1 Jun. 16, 2011

(30) Foreign Application Priority Data
Aug. 15, 2008 (CN) .......................... 2008 1 0213233

(51) Int. Cl.
*G06F 15/16* (2006.01)
*H04L 29/12* (2006.01)
*H04L 29/06* (2006.01)

(52) U.S. Cl.
CPC ...... *H04L 29/12594* (2013.01); *H04L 61/3095* (2013.01); *H04L 65/1016* (2013.01); *H04L 65/1073* (2013.01)
USPC ............. 709/223; 709/227; 705/64; 370/328; 370/352; 370/401; 370/331; 370/230

(58) Field of Classification Search
CPC ....................................................... G06F 15/16
USPC ........ 709/223, 227; 705/64; 455/435.1, 432.1
See application file for complete search history.

(56) References Cited

U.S. PATENT DOCUMENTS 7,633,902 B2 * 12/2009 Hara et al. ..................... 370/331
7,974,295 B2 * 7/2011 Tuohino et al. ............... 370/401
(Continued)

FOREIGN PATENT DOCUMENTS

CN        1838610 A     9/2006
CN        1859426 A     11/2006
(Continued)

OTHER PUBLICATIONS

International Search Report for International Patent Application No. PCT/CN2009/072704, completed Sep. 23, 2009, mailed Oct. 15, 2009 (3 pages).

(Continued)

Primary Examiner — Jude Jean Gilles
(74) Attorney, Agent, or Firm — Clark & Elbing LLP

(57) ABSTRACT

The present invention provides a method, a device, and a system for realizing a registration mechanism of an IP multimedia subsystem. In the above method, a S-CSCF obtains a private user identity and a public user identity of CS UE and characteristic information of a MSC Server from a received request message, wherein the request message includes a registration request or a de-registration request; and then matches the obtained private user identity, public user identity, and characteristic information with existing registration binding relationships. If the match is successful, an operation indicated by said request message is performed on the successfully matched registration binding relationship. Based on the solution proposed in the present invention, the logic of the registration service can be ensured to be normal.

17 Claims, 9 Drawing Sheets

(56) References Cited

U.S. PATENT DOCUMENTS

| | | |
|---|---|---|
| 8,134,956 B2 * | 3/2012 | Siegel et al. ............... 370/328 |
| 8,472,431 B2 * | 6/2013 | Siegel et al. ............... 370/352 |
| 2003/0027569 A1 | 2/2003 | Ejzak |
| 2007/0086581 A1 | 4/2007 | Zhu et al. |
| 2007/0109998 A1 * | 5/2007 | Hara et al. ............... 370/331 |
| 2008/0160995 A1 | 7/2008 | Thiebaut et al. |
| 2009/0103518 A1 * | 4/2009 | Yu et al. ............... 370/352 |
| 2009/0190573 A1 * | 7/2009 | Siegel et al. ............... 370/352 |
| 2009/0191867 A1 * | 7/2009 | Siegel et al. ............... 455/435.1 |
| 2009/0191870 A1 * | 7/2009 | Siegel et al. ............... 455/435.1 |
| 2009/0191873 A1 * | 7/2009 | Siegel et al. ............... 455/435.2 |
| 2010/0046501 A1 | 2/2010 | Witzel et al. |
| 2010/0246444 A1 | 9/2010 | Witzel et al. |

FOREIGN PATENT DOCUMENTS

| | | |
|---|---|---|
| EP | 1770949 A2 | 4/2007 |
| WO | WO-2006099815 A1 | 9/2006 |
| WO | WO-2008/022647 A1 | 2/2008 |
| WO | WO-2008/055559 A1 | 5/2008 |

OTHER PUBLICATIONS

International Preliminary Report on Patentability for International Application No. PCT/CN2009/072704, issued Feb. 15, 2011 (6 pages).

Written Opinion of the International Searching Authority for International Application No. PCT/CN2009/072704, completed Sep. 23, 2209, mailed Oct. 15, 2009 (5 pages).

Extended European Search Report for European Patent Application No. 09806333.2, dated Dec. 3, 2013 (5 pages).

* cited by examiner

METHOD, SYSTEM, AND DEVICE FOR REALIZING REGISTRATION MECHANISM OF IP MULTIMEDIA SUBSYSTEM

CROSS-REFERENCE TO RELATED APPLICATIONS

This application is the U.S. National Stage filing under 35 U.S.C. §371 of International Application No. PCT/CN2009/072704 filed Jul. 9, 2009, which claims benefit of Chinese Patent Application No. 200810213233.4, filed Aug. 15, 2008.

FILED OF THE INVENTION

The present invention relates to the technical field of mobile communication, in particular to a method, a system, and a device for realizing a registration mechanism of an IP multimedia subsystem.

BACKGROUND OF THE INVENTION

At present, mobile networks, such as Global System for Mobile communications (GSM for short) and Universal Mobile Telecommunications System (UMTS for short), adopt circuit switching techniques called as Circuit Switched (CS for short) domains, which are capable of providing basic voice services and supplementary services based on the voice services for a user. When the CS domain accesses an IP Multimedia Core Network Subsystem (IMS for short), it evolves into an access mode, wherein the services thereof are provided by the IMS in centralized way which is called as an IMS Centralized Service (ICS for short).

FIG. 1 shows an application scene of the IMS centralized service. As shown in FIG. 1, IMS User Equipment (IMS UE for short) 101, for which an IMS network provides services, accesses an IP multimedia subsystem 105 via a Packet Switched (PS for short) access network 102. Using the techniques of the IMS centralized service, CS User Equipment (CS UE for short) 103, for which the IMS network provides services, accesses an IP multimedia subsystem 105 via a CS access network 104. Thus, the IMS network can provide services for users using different access modes.

FIG. 2 is an architecture diagram of an IMS centralized control service. As shown in FIG. 2, there are included the following network elements:

a CS UE 201, which accesses an Enhanced Mobile Switching Center Server (eMSC Server for short) via CS control signaling;

an enhanced MSC Server 202, which, as an enhanced CS MSC Server, may serve as a user agent for a Session Initiation Protocol (SIP for short) to realize interworking between CS signaling and a SIP message and take the place of a user for accessing the IMS, besides achieving the functions of call control, mobility management, and an access of CS user equipment;

a Media Gateway (MGW for short) 203, which is used for interworking between a media stream over a CS and a media stream over an IP and establishing a media connection between the user equipment 201 and a remote user;

a Call Session Control Function (CSCF for short) 204, which can be classified into Interrogating CSCF (I-CSCF for short) and Serving CSCF (S-CSCF for short), wherein the I-CSCF interacts with a Home Subscriber Server (HSS for short) to request the HSS to assign the S-CSCF for a user or inquire a S-CSCF in which the user is located, wherein the S-CSCF is used for providing functions of registration, call control, etc. for a user;

an Application Server (AS for short) 205, comprising a service continuity server, a telephony service server, and so on, which can provide a user with services of service continuity, telephony services, etc.; and a HSS/Home Location Register (HLR for short) 206, which is used for storing user's subscription data and providing support for a call or a session, wherein the HLR can be regarded as a subset of the HSS and serves for a legacy CS domain and a packet domain. In practical application, the HLR and the HSS can be integrally provided in a same physical entity, or located in different entities. When the HSS and the HLR are located in different entities, the HSS and the HLR have interfaces therebetween for realizing information interaction.

The CS UE 201 accesses the enhanced MSC Server 202 via CS control signaling. The enhanced MSC Server 202 serves as a user agent for taking the place of the CS UE 201 to access the CSCF 204 of the IMS network and to establish a session connection with a remote user. Meanwhile, the enhanced MSC Server 202 controls the MGW 203 to accomplish switching between a media stream over a CS and a media stream over an IP and establishes a media connection between the CS UE 201 and the remote user.

It is required in the IMS centralized service to establish a binding relationship between a user identity and an actual physical contact address, viz. to establish corresponding relationships among a Private User Identity (PVI for short), a Public User Identity (PUI for short), and an actual physical contact address of an UE. A contact address can be determined from a user identity via above corresponding relationships, so as to establish a connection with the UE.

When the CS UE accesses the IMS system, the enhanced MSC Server replaces the CS UE to initiate registration to the IMS, to establish a registration binding relationship, viz. to establish corresponding relationships among the PVI and the PUI of the CS UE and the contact address of the enhanced MSC Server. In an existing registration process, said binding relationship is determined by the PVI and the PUI.

After the location of the CS UE in the enhanced MSC Server is successfully updated and is successfully registered in the IMS, said CS UE, when moving, possibly moves into the serving area of a new MSC Server (target MSC Server), wherein the target MSC Server is possibly either a common MSC Server (viz. a MSC Server without an enhanced ICS capacity), or an enhanced MSC Server.

When the target MSC Server is an enhanced MSC Server, the current registration process is as shown in FIG. 3. For conciseness, a process of upgrading the location of a CS domain and a process of an IMS registration are mainly described in the flow process of the figure, wherein no description of a security authentication process and a CS user data insertion process is made herein. As shown in FIG. 3, there are mainly included the following steps:

step S301: an UE initiates a process of upgrading a CS location, and sends a location updating request to a target MSC Server;

step S302: the target MSC Server sends the location updating request to a HSS/HLR;

step S303: the HSS/HLR accepts the location updating and returns a location upgrading acceptance response to the target MSC Server, In a specific operation process, standard CS access authentication and user data insertion processes are also performed during Step S302 to Step S303, and the HSS/HLR inserts an ICS indication into user data or location updating acceptance response, indicating said user signs up for the ICS service;

step S304: the target MSC Server returns to the UE a response of successfully updating location, Since the target MSC Server is an enhanced MSC Server, the target MSC Server would check the ICS indication in the user data or location updating acceptance response to determine whether the user is an ICS user; wherein if it is determined that the user is an ICS user, step S308 is performed to replace the UE for performing an IMS registration process;

step S305: the HSS/HLR sends a location cancelling request to a source MSC Server;

step S306: the source MSC Server returns a location cancelling response to the HSS/HLR and deletes CS user records stored locally;

step S307: the source MSC Server replaces the CS UE to perform an IMS de-registration process; wherein since the CS UE is no longer in an active state in the source MSC Server, the source MSC Server replaces the CS UE to perform an IMS de-registration process; the source MSC Server sends a de-registration request to the S-CSCF, and the S-CSCF deletes the initial registration binding relationship (viz. the corresponding relationships among a PVI, a PUI, and a contact address of the source MSC Server); and step S308: the target MSC Server replaces the UE to initiate a registration process of the IMS centralized service wherein after the user's location in the target MSC Server is updated successfully, the target MSC Server replaces the UE to perform an IMS registration process, the target MSC Server sends a registration request to the S-CSCF of the IMS system, and the S-CSCF establishes a new registration binding relationship (the relationships among the private user identity, the public user identity, and the contact address of the target MSC Server). Thus, the IMS updates the registration binding relationship.

From the above processes, it can be determined that the registration process initiated by the target MSC Server and the de-registration initiated by the source MSC Server are performed independently, therefore, the sequence in which the registration request sent by the target MSC Server and the de-registration request sent by the source MSC Server reach the S-CSCF can not be determined. If the registration request reaches the S-CSCF ahead of the de-registration request, the S-CSCF performs a registration process. If it is found that the user has registered (PVI-PUI-contact address of the source MSC Server), a new registration relationship is used (PVI-PUI-contact address of the target MSC Server) to replace the old registration relationship. Subsequently, the de-registration request reaches the S-CSCF, the S-CSCF matches the binding relationship using the PVI and the PUI. If finding the user has registered (PVI-PUI-contact address of the target MSC Server), the S-CSCF would deem that the newly established registration relationship (PVI-PUI-contact address of the target MSC Server) shall be de-registered. Thus, the newly established registration relationship is de-registered, which results in logical errors of services, and might cause an error of the registration binding relationship so as to affect the normal processing of the service.

SUMMARY OF THE INVENTION

In consideration of the above, the present invention provides a method, a device and a system for realizing a registration mechanism of an IP multimedia subsystem to solve the problem of logical disorder in registration possibly present in the prior art.

According to one aspect of the present invention, there is provided a registration method of an IP multimedia subsystem, said method being applied to a network environment including CS UE, an enhanced MSC Server, and an IMS.

The registration method of the IP multimedia subsystem according to the present invention includes: a S-CSCF obtains a private user identity and a public user identity of a CS HE and characteristic information of a MSC Server from a received request message, wherein the request message includes a registration request or a de-registration request; the S-CSCF matches the obtained private user identity, public user identity, and characteristic information with existing registration binding relationships; and if the match is successful, an operation indicated by said request message is performed on the successfully matched registration binding relationship.

According to another aspect of the present invention, an S-CSCF is provided.

The S-CSCF according to the present invention comprises: an obtaining module configured to obtain, from a request message received, a private user identity and a pubic user identity of CS UE as an initiation side and characteristic information of a MSC Server replacing the CS UE to send a request message to said S-CSCF, wherein the request message includes: a registration request or a de-registration request; a matching module configured to match the private user identity, the public user identity and the characteristic information obtained by the obtaining module with existing registration binding relationships; and an executing module configured to perform an operation indicated by the request message based on the matching result of the matching module.

According to yet another aspect of the present invention, a MSC Server is provided.

The MSC Server according to the present invention comprises: a deciding module configured to determine whether to replace a CS UE to perform an IMS registration or de-registration; a setting module configured to make a registration identity of the MSC Server to be carried in a request message sent to the IMS after the deciding module determines to replace the CS UE to perform the IMS registration or de-registration; and a sending module configured to send the request message set by the setting module.

According to yet another aspect of the present invention, a system for realizing an IMS registration mechanism is provided.

The system for realizing the IMS registration mechanism according to the present invention comprises: a MSC Server configured to replace a CS UE to send a request message to an IMS system, wherein the request message carries a private user identity and a public user identity of the CS UE, and characteristic information of a MSC Server; and a S-CSCF configured to receive the request message sent by the I-CSCF and matching the PVI, PUI and characteristic information carried in the request message with existing registration binding relationships, wherein if the match is successful, an operation indicated by the request message is performed on the matched registration binding relationship.

By means of at least one of the above technical solutions of the present invention, a enhanced MSC Server is made to replace a user to generate different registration binding relationships by changing existing registration matching relationships, so as to avoid the problem of logical disorder in service during the UE move and ensure the service to be processed normally.

Other characteristics and advantages of the present invention are described in the subsequent parts of the description, and are partly obvious from the description or understood by implementing the present invention. The object and other advantages of the present invention can be realized or obtained by virtue of the structures particularly mentioned in the description, the claims, and the drawings.

BRIEF DESCRIPTION OF THE DRAWINGS

The drawings provide a further understanding of the present invention, and form a part of the description. The drawings are used to explain the present invention together with the embodiments of the present invention without unduly limiting the present invention, wherein.

DETAILED DESCRIPTION OF THE PREFERRED EMBODIMENTS

Functional Generalization

As described above, the binding relationships are matched based on the PVI and the PUI in the existing IMS registration mechanism, and when the UE moves, requests of de-registering an old registration relationship and registering a new registration relationship are sent simultaneously to the S-CSCF, the two requests being independent of each other, therefore, there might occur the case that a new registration relationship is registered first and then the newly established registration relationship is de-registered, resulting in logical error of service which affects normal process of the service. With respect to the above problem, the present invention provides a solution for realizing an IMS registration mechanism.

In the solution of realizing the IMS registration mechanism provided in the embodiment of the present invention, the S-CSCF performs a match process on the registered binding relationships not only based on the PVI and the PUI but also based on the characteristic information of the MSC Server, thereby solving the above problem.

The preferred embodiments of the present invention will be described hereinafter in conjunction with the drawings. It shall be understood that the preferred embodiments described herein are merely used for explaining and describing the present invention rather than unduly limiting the present invention.

According to an embodiment of the present invention, a system for realizing an IMS registration mechanism is provided.

Figure 1:
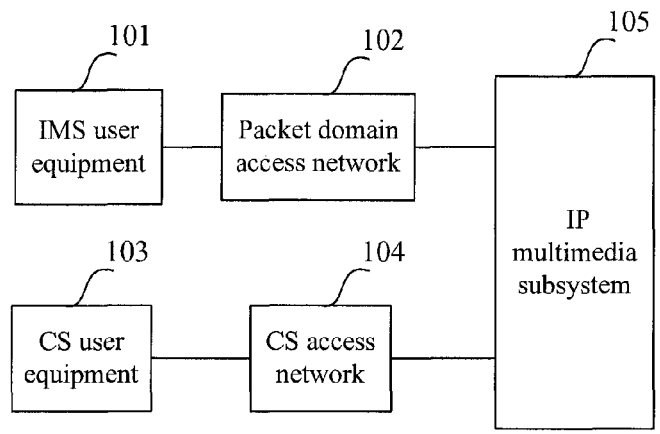
FIG. 1 is a schematic diagram showing an application scene of an IMS centralized service in the prior art.
Figure 2:
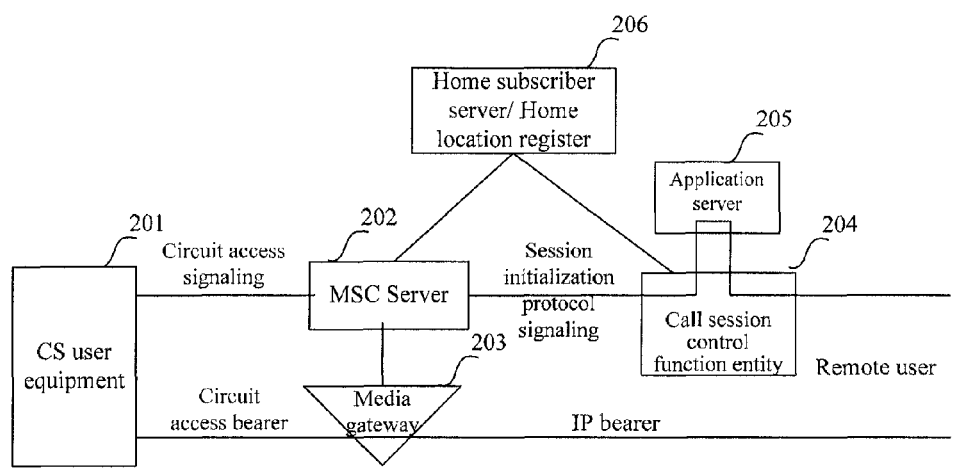
FIG. 2 is an architecture diagram showing an IMS centralized control service in the prior art.
Figure 3:
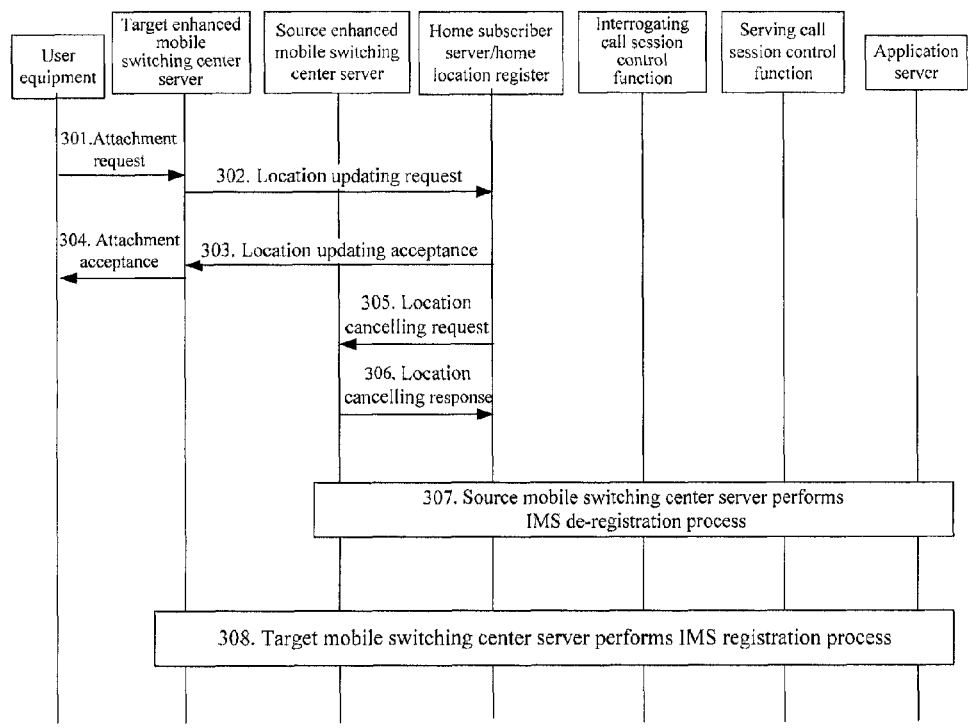
FIG. 3 is a flow chart of a registration of an IMS centralized service when UE moves between enhanced MSC Servers in the prior art.
Figure 4:
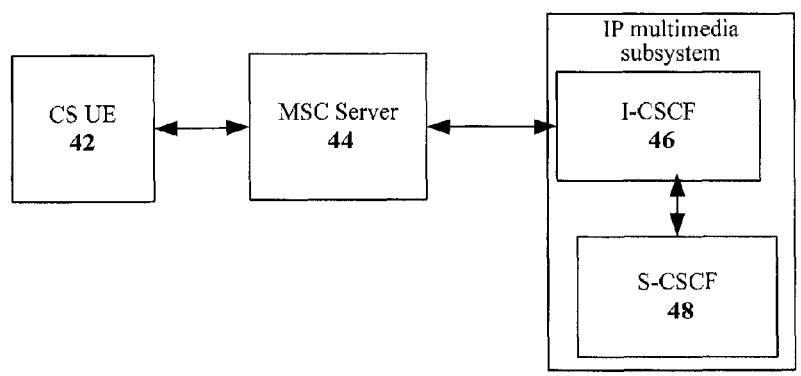
FIG. 4 is a block diagram showing a structure of a system for realizing an IMS registration mechanism according to an embodiment of the present invention.

FIG. 4 is a block diagram of a structure of a system for realizing an IMS registration mechanism according to an embodiment of the present invention. As shown in FIG. 4, the system for realizing the IMS registration mechanism according to the embodiment of the present invention comprises: CS UE 42, a MSC Server 44, and an I-CSCF 46 and a S-CSCF 48 of an IMS. The above entities are further described hereinafter in conjunction with the drawings.

The CS UE 42 is used for sending a location updating request to the MSC Server 44.

The MSC Server 44, connected to the CS UE 42 via a network, is used for replacing the CS UE 42 to send a request message to the I-CSCF 46 of the IMS system after the location of the CS UE 42 in the MSC server 44 is updated successfully, wherein the request message carries a PVI and PUI of the CS UE 42, and characteristic information of the MSC Server 44;

The I-CSCF 46, connected to the MSC Server 44 via a network, is used for forwarding the request message sent by the MSC Server 44 to the S-CSCF 48.

The S-CSCF 48, connected to the I-CSCF 46 via a network, is used for receiving the request message forwarded by the I-CSCF 46 and matching the PVI, PUI and characteristic information carried in the request message with existing registration binding relationships. If the match is successful, an operation indicated by the above request message is performed on the matched registration binding relationship.

Moreover, in a case that the match is unsuccessful and the request message is a registration request, the S-CSCF 48 is further used for performing an initial registration process and establishing a registration binding relationship including the characteristic information of the MSC Server 44.

In the process of specific implementation, if the match is successful and the request message is a registration request, the S-CSCF 48 initiates a re-registration process and updating the matched registration binding relationship by using new registration relationship.

wherein the characteristic information can be either a contact address of the MSC Server or a registration identity of the MSC Server. Said registration identity possesses uniqueness, viz. when different MSC Servers replace the same UE to perform a registration decision, the registration identities thereof are different. When the characteristic information is a registration identity, the registration identity may be a single item of the registration binding relationships, herein, the registration binding relationship is: PVI-PUI-contact address of the MSC Server-registration identity of the MSC Server. The registration identity can also be inserted into the PVI, serving as an extended PVI, herein the registration binding relationship is: extended PVI-PUI-contact address of the MSC Server.

Moreover, when the characteristic information is a registration identity of the MSC Server, the MSC Server 44 is also used for generating said registration identity, and making the registration identity to be carried in a request message and sending the request message to the S-CSCF or inserting the registration identity into the PVI carried in the request message and sending the request message to the S-CSCF.

Based on the above system provided in the embodiment of the present invention, when registering, the match of the existing registration binding relationships can be performed based on the PVI, PUI, and the characteristic information of the MSC Server so as to avoid the problem that the newly registered binding relationship is erroneously de-registered when the UE moves.

According to an embodiment of the present invention, an S-CSCF, belonging to the IMS system, is also provided.

Figure 5:
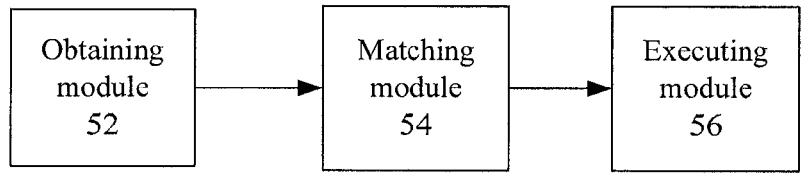
FIG. 5 is a block diagram showing a structure of a S-CSCF according to an embodiment of the present invention.

FIG. 5 is a block diagram of a structure of an S-CSCF according to an embodiment of the present invention. As shown in FIG. 5, the S-CSCF according to an embodiment of the present invention comprises: an obtaining module 52, a matching module 54, and an executing module 56. The above respective modules are further described hereinafter in conjunction with the drawings.

The obtaining module 52 is used for obtaining the PVI and PUI of a CS UE from a received request message and replacing the CS UE to send the characteristic information of a MSC Server in the request message to the S-CSCF. In a specific implementing process, the characteristic information of the MSC Server may be either a contact address of the MSC Server or a registration identity of the MSC Server.

The matching module 54, connected to the obtaining module 52, is used for matching the PVI, PUI, and characteristic information obtained by the obtaining module 52 with the existing registration binding relationships.

The executing module 56, connected to the matching module 54, is used for performing an operation indicated by the above request message based on the matching result of the matching module 54, wherein the operation indicated by the request message includes: initiating an IMS registration or de-registration.

The above S-CSCF according to the embodiment of the present invention could perform the match based on the PVI, PUI and characteristic information of the MSC Server in a case of the IMS registration, thus, registration binding relationships, which different MSC Servers replace the same UE to establish, would not be regarded as the same registration relationships.

According to an embodiment of the present invention, a MSC Server, belonging to an IMS system, is also provided.

Figure 6:
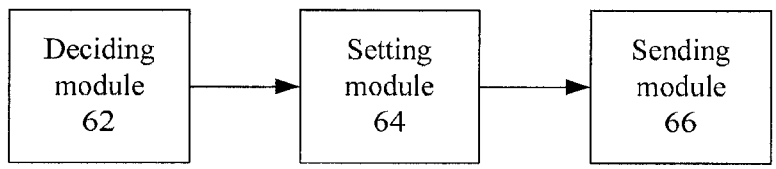
FIG. 6 is a block diagram showing a structure of a MSC Server according to an embodiment of the present invention.

FIG. 6 is a block diagram of a structure of an MSC Server according to an embodiment of the present invention. As shown in FIG. 6, the MSC Server according to the embodiment of the present invention comprises: a deciding module 62, a setting module 64, and a sending module 66. The above respective modules are further described hereinafter in conjunction with the drawings.

The deciding module 62 is used for determining whether to replace the CS UE to perform an IMS registration or de-registration;

The setting module 64, connected to the deciding module 62, is used for making a registration identity of the MSC Server to be carried in a request message sent to the IMS after the deciding module 62 decides to replace the CS UE for performing an IMS registration or de-registration.

The sending module 66, connected to the setting module 64, is used for sending a request message set by the setting module 64.

The above MSC Server according to the embodiment of the present invention sends the characteristic information of the MSC Server to the IMS when initiating a registration or de-registration to the IMS.

According to an embodiment of the present invention, a method for realizing an IMS registration mechanism is also provided. Said method is applied to a network environment including CS UE, an enhanced MSC Server, and an IMS.

Figure 7:
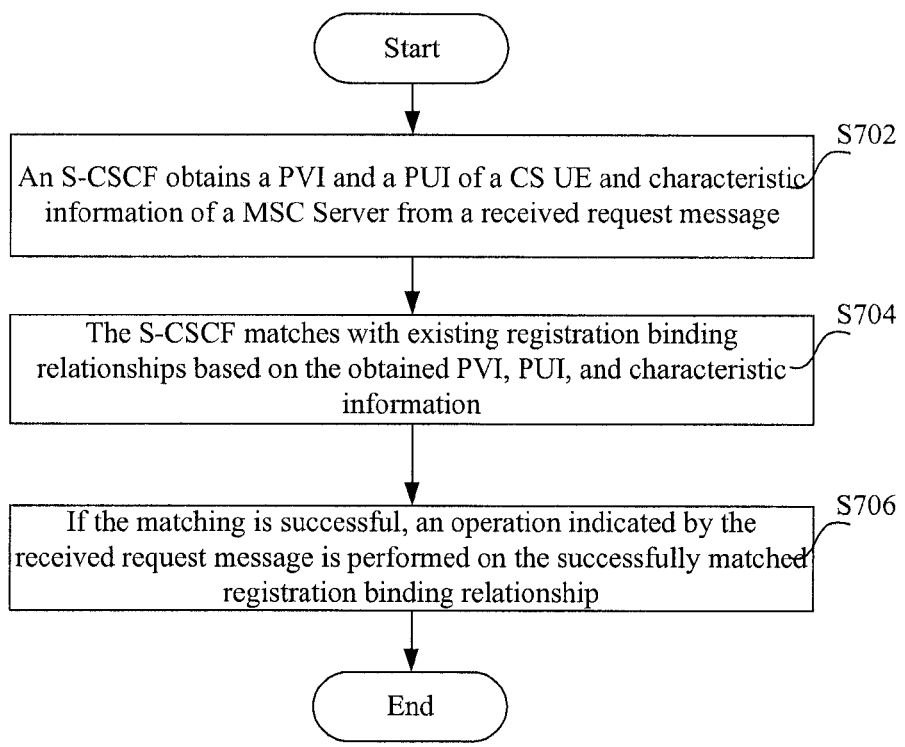
FIG. 7 is a flow chart of a method for realizing an IMS registration mechanism according to an embodiment of the present invention.

FIG. 7 is a flow chart showing a method for realizing an IMS registration mechanism according to an embodiment of the present invention. As shown in FIG. 7, the method for realizing the IMS registration mechanism according to the embodiment of the present invention includes the following processes (step S702 to step S706):

Step S702: the S-CSCF obtains the PVI and PUI of a CS UE and the characteristic information of a MSC Server from a received request message, wherein the request message comprises a registration request or a de-registration request;

Step S704: the S-CSCF matches the obtained PVI, PUI and characteristic information with existing registration binding relationships; and Step S706: if the match is successful, an operation indicated by the received request message is performed on the successfully matched registration binding relationship.

Details of the above respective processes are further described hereinafter.

(1) Step S702

The process of step S702 can be triggered by the following manner: after the location of the CS UE in the enhanced MSC Server is updated successfully, the MSC Server replaces the CS UE to initiate a registration to the IMS, or after the CS UE moves from a source MSC Server to a target MSC Server and the CS UE's location in the target MSC Server is updated successfully, the source MSC Server replaces the CS UE to initiate a de-registration to the IMS, or if the CS UE is not active in the enhanced MSC Server due to other reasons, the enhanced MSC Server replaces the CS UE to initiate a de-registration to the IMS.

In a specific implementing process, prior to step S702, said method also comprises the following steps:

Step 1: the MSC Server replaces the CS UE to send a request message to the I-CSCF of the IMS;

In a specific implementing process, the MSC Server could infer the information such as a PVI and PUI of the CS UE. from the user identity carried in the location updating request sent from the CS UE, and make the information such as the PVI and PUI carried in the request message and send the request message to the IMS system;

For example, in a 3GPP organization, a user identity is an International Mobile Subscriber Identity (IMSI for short), which is a globally unique 15-digits code for identifying an individual user and consists of a 3-digits Mobile Country Code (MCC for short), a 2 to 3-digits Mobile Network Code (MNC for short), and a Mobile Subscriber Identification Number (MSIN for short) wherein the comprised sequence thereof is [MCC][MNC][MSIN], thereby it can be inferred therefrom that the user home domain, PVI, and PUI of the CS UE are as follows respectively:

user home domain: ics.mnc<MNC>.mcc<MCC>.3gppnetwork.org;

PVI: <IMSI>@ics.mnc<MNC>.mcc<MCC>.3gppnetwork. org;

PUI: SIP: <IMSI>@ics.mnc<MNC>. mcc<MCC>.3gppnetwork.org;

for example, if the IMSI of the CS UE is 234150999999999, viz. MCC=234, MNC=15, and MSIN=0999999999, and herein, home domain: ics.mnc015.mcc234.3gppnetwork.org;

PVI: 234150999999999@ics.mcc015.mcc234.3gppnetwork. org;

PUI: SIP: 234150999999999@ics.mnc015.mcc234.3gppnetwork.org.

Step 2: the I-CSCF sends a S-CSCF assigning request to an HSS/HLR, and the HSS/HLR returns an assigning response to the I-CSCF, wherein said response carries an address of S-CSCF assigned; and Step 3: the I-CSCF forwards the received request message to the S-CSCF based on the address of S-CSCF assigned.

The S-CSCF, after receiving said request message, obtains therefrom the PVI and PUI of the CS UE and the characteristic information of the MSC Server, Wherein the characteristic information of the MSC Server includes: a contact address of the MSC Server or a registration identity of the MSC Server. Moreover, the MSC Server makes a registration identity to be carried directly in the request message and send the request message to the IMS or inserts the registration identity into a PVI to form an extended PVI, and then makes the extended PVI to be carried in the request message and send the request message to the IMS.

When the characteristic information of the MSC Server is a registration identity, the MSC Server first generates a registration identity and then makes the registration identity to be carried in the request message and sends it in the above step 1. In a specific implementing process, the registration identities generated by different enhanced MSC Servers possess uniqueness as for the same UE, viz. one registration identity could solely identify one connection relationship between the MSC Server and the CS UE. Moreover, the registration identity remains unchanged during a life cycle of a registration process, viz. from the time when the MSC Server replaces the CS UE to initiate an initial registration to the time when the UE is de-registered from the MSC Server.

In a specific implementing process, the MSC Server generates a registration identity based on node information, wherein the node information includes but is not limited to: a signaling node number, a node number, an IP address, and a host name of the MSC Server.

Specifically, the MSC Server generates a registration identity based on the node information in the following two manners:

(1) the MSC Server uses directly the node information as a registration identity;
(2) the MSC Server computes the node information via a predetermined algorithm to obtain a registration identity, including: the MSC Server intercepts one part of the node information as a registration identity, and the MSC Server uses a hash function to compute the node information to obtain a registration identity.

After the MSC Server generates a registration identity, if the registration identity is inserted into the PVI and is carried in the form of an extended PVI in the request message to be sent to the IMS, the following settings are made:

extended PVI=PVI+registration identity or extended PVI=registration identity+PVI.

Since the MSC Server sends an extended PVI to the IMS system, the IMS system needs to parse the extended PVI received to obtain a PVI therefrom. In a specific implementing process, the IMS system parses out the PVI from the extended PVI in the following two manners:

(1) in the above Step 2, the I-CSCF, after receiving the request message from the MSC Server, makes the extended PVI and PUI to be carried in the S-CSCF assigning request and sends them to the HSS/HLR, and the HSS/HLR obtains the PVI based on the extended PVI and performs an S-CSCF assigning operation;
(2) the I-CSCF, after receiving the request message from the MSC Server, obtains the PVI based on the extended PVI and makes the extended PVI and PUI to be carried in the S-CSCF assigning request and sends them to the HSS/HLR, and the HSS/HLR performs a S-CSCF assigning operation.

(I) Step S704

The S-CSCF performs the match on the stored existing registration binding relationship based on the obtained PVI, PUI, and characteristic information. When one existing registration binding relationship matches the obtained PVI, PUI, and characteristic information, the match is determined to be successful, otherwise, the match is determined as unsuccessful, indicating the registration relationships are different.

Since the characteristic information field is added in the process of match, it can be ensured that the matched registration relationship is the registration relationship established by same MSC Server for same CS UE.

(II) Step S706

In a case that the match is successful, it is indicted that the requested registration relationship is the same as the existing registration binding relationship, and an operation indicated by the request message is performed on the successfully matched registration binding relationship according to the content of the request message.

If the request message is a registration request, the S-CSCF performs a re-registration process and updates the initial registration binding relationship. If the request message is a de-registration request, the S-CSCF performs a de-registration process to de-register the initial registration binding relationship.

Furthermore, if the registration binding is not matched in step S704, the S-CSCF, in a case that the request message is a registration request, initiates an initial registration process and establishes a registration binding relationship including the characteristic information, viz. if the characteristic information is a contact address of the MSC Server, a registration binding relationship of PVI-PUI-contact address of the MSC Server is established. If the characteristic information is a registration identity of the MSC Server and the registration identity is carried directly in the request message to be sent to the S-CSCF, a registration binding relationship of PVI-PUI-contact address of the MSC Server-registration identity of the MSC Server is established. If the characteristic information is a registration identity of the MSC Server, which is inserted into the PVI and sent to the S-CSCF in the form of an extended PVI, a registration binding relationship of extended PVI-PUI-contact address of the MSC Server is established.

By the above methods of the embodiments of the present invention, it can be realized that different MSC Servers replace the CS UE to generate different registration binding relationships.

In order to further describe the specific embodiments of the above methods, specific examples are explained in the following:

Example 1

Figure 8:
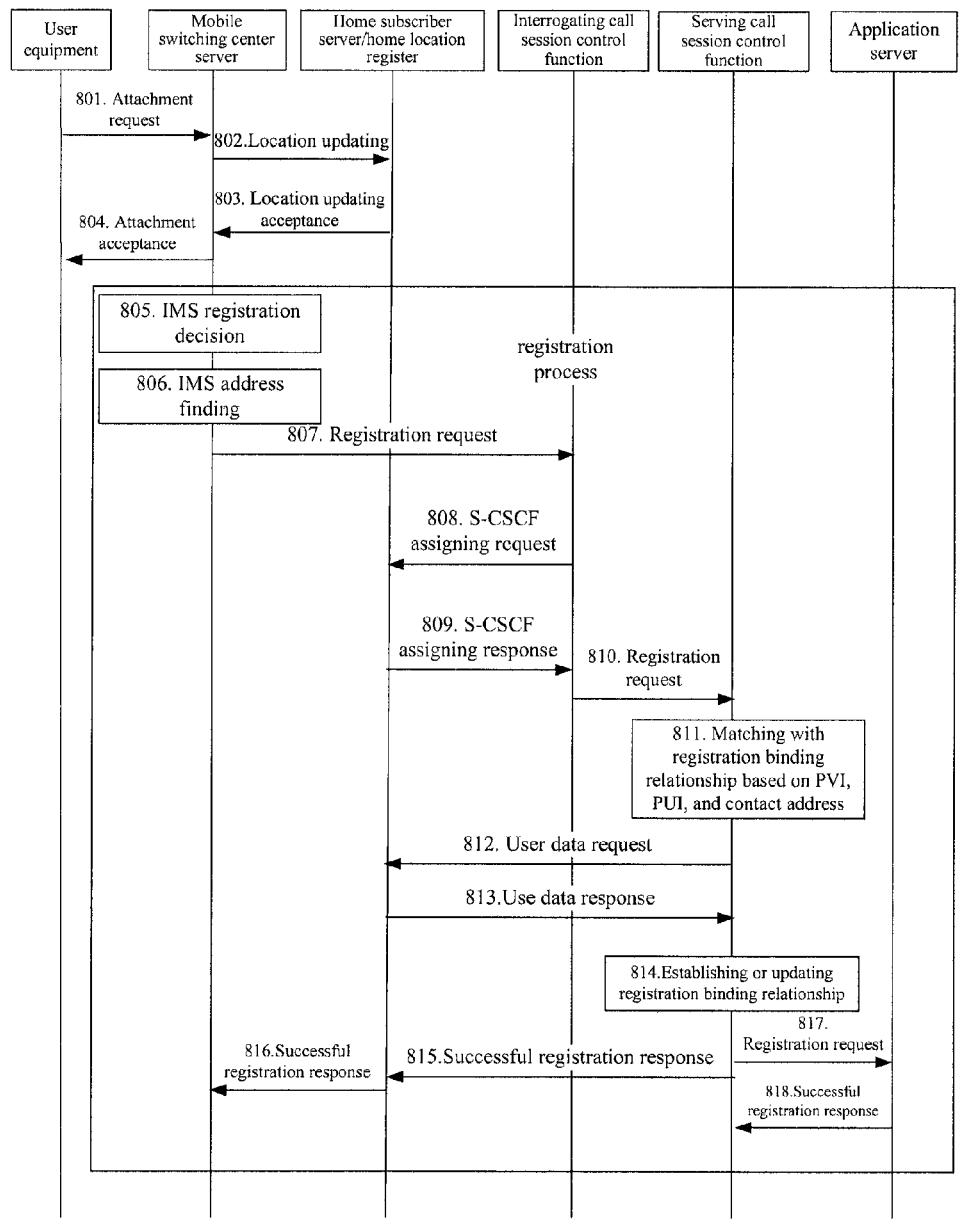
FIG. 8 is a flow chart of a specific implementing process of Example 1 of the present invention.

In said example, the MSC Server replaces the CS UE to perform a registration process, and the characteristic information of the MSC Server is a contact address of the MSC Server. As shown in FIG. 8, the specific implementing process in this example includes:

Step S801: the UE initiates a CS location updating process and sends a location updating request to the MSC Server;

Step S802: the MSC Server sends a location updating request to the HSS/HLR;

Step S803: the HSS/HLR accepts the location updating and returns a location updating acceptance response to the MSC Server;

in a specific implementing process, the processes, such as CS access authentication, user data insertion, are also performed in steps S802 to S803. Moreover, the HSS/HLR will insert an ICS indication into user data or the location updating acceptance response, wherein the ICS indication indicates that said user subscribes the ICS service;

Step S804: the MSC server returns a response of successfully accepting the location updating to the UE;

Step S805: after the location of the UE in the MSC Server is updated successfully, the MSC Server performs an IMS registration decision; if it is found that an ICS indication is included in the user data or the location updating response, viz. the user is an ICS user, it is determined to replace the user to initiate an IMS registration;

Step S806: the MSC Server infers home domain, PVI, and PUI of the user from the user identity and finds an address of a suitable entry point, e.g. the address of the I-CSCF, etc;

for example, assuming that the IMSI of the user is 234150999999999, viz. MCC=234, MNC=15, and MSIN=0999999999, it can be inferred that:

home domain: ics.mnc015.mcc234.3gppnetwork.org;

PVI: 234150999999999@ics.mnc015.mcc234.3gppnetwork.org; and

PUI: SIP: 234150999999999@ics.mnc015.mcc234.3gppnetwork.org;

Step S807: the MSC Server sends a SIP registration request, wherein the SIP registration request contains a PVI, a PUI, and a contact address of the MSC Server, and the request contains an indication for an accessing manner, wherein the indication indicates that the registration request is sent from the MSC Server;

wherein, the contact address is SIP URI, and the host part thereof is contact address of the MSC Server, either an IP address of the MSC Server or a full domain name of the MSC Server, and a user number can be either inserted into the user part, e.g. sip:+861004821437@msc.home1.net, or not inserted into the user part, e.g. sip:msc.home1.net;

Step S808: the I-CSCF sends a S-CSCF assigning request to the HSS to request the HSS to assign an S-CSCF serving for the user;

Step S809: the HSS assigns the S-CSCF for the user, assigns a response message via the S-CSCF, and sends the related information of the assigned S-CSCF (e.g. the address or identity of the S-CSCF, etc.) to the I-CSCF;

Step S810: the I-CSCF forwards a registration request to the S-CSCF assigned by the HSS;

Step S811: the S-CSCF matches the PVI, PUI, and contact address of the MSC Server in the registration request with the registered registration binding relationships;

During the match of the registration binding relationships, only after the PVI, PUI, and contact address of the MSC Server are all matched, the S-CSCF determines the received registration request to be matched with the existing registration binding relationship, and needs to perform a re-registration and update the existing registration binding relationship, and executes Step S812 or directly execute Step S814 by skipping Steps S812 and S813; otherwise a new registration is determined and Step S812 is executed;

Step S812: the S-CSCF interacts with the HSS, and sends the HSS a user data download request, which carries the PVI and PUI, to require downloading subscription data of the user;

Step S813: the HSS returns a user data response to the S-CSCF, wherein said response includes the subscription data of the user. Wherein, the contract data of the user includes a plurality of PUI related to the registration, comprising a PUI used when the user uses a telecommunication services, e.g. tel: +861004821437, etc., besides a PUI inferred from a user identity, wherein the inferred PUI is not used for the service and is needed to be prohibited;

Step S814: the S-CSCF stores or updates a registration binding relationship of the UE, wherein the binding relationship comprises: the corresponding relationships among the PVI, the PUI and the contact address. Moreover, if it is a new registration, the S-CSCF establishes and stores a registration relationship; if it is a re-registration, the S-CSCF updates the initial registration relationship;

Step S815: the S-CSCF returns a successful registration response to the I-CSCF, wherein said response contains a PUI which can be used by a user but not the prohibited PUI mentioned above;

Step S816: the I-CSCF forwards the successful registration response to the MSC Server, and the MSC Server stores registration information and uses the first PUI contained in the response as a default PUI;

Step S817: the S-CSCF triggers a registration process of a third party based on an initial filter criteria for the user's contract data, sends a registration request to an AS and informs an AS the registration information of the user;

wherein, the AS includes an ICS application server, a telephone service server, etc.; and Step S818: the AS returns a successful registration response.

Herein, the enhanced MSC Server replaces the UE to complete a registration in the IMS, and a registration binding relationship (the relationships between PVI, PUI and the contact address of the enhanced MSC Server) is established in the S-CSCF.

Example 2

In said example, a UE moves to a target MSC Server. After the location in the target MSC Server is updated successfully, a source MSC Server replaces a CS UE to perform a de-registration process. The characteristic information of the MSC Server is a contact address of the MSC Server. Obviously, the process is also suitable for a case that the UE is on longer active in an enhanced MSC Server due to other reasons, such as the UE is successfully detached to a source enhanced MSC Server, the UE is detached compulsorily by a network, etc. As shown in FIG. 8, the specific executing process in said example includes:

Step S901: the UE initiates a CS location updating process and sends a location updating request to the target MSC Server;

Step S902: the target MSC Server sends a location updating request to a HSS/HLR;

Step S903: the HSS/HLR accepts the location updating and returns a location updating acceptance response to the target MSC Server;

in the Step S902 to Step S903, processes of standard CS access authentication and user data insertion are also performed;

the HSS/HLR inserts an ICS indication in the user data or the location updating acceptance response, indicating said user signs a contract for an ICS service;

step S904: the target MSC Server returns a response of successfully updating the location to the UE;

since the target MSC Server is a common MSC Server, the target MSC Server will neglects the ICS indication in the user data or the location updating acceptance response, and does not replace the UE to perform an IMS registration process;

Step S905: the HSS/HLR sends a location cancelling request to the source MSC Server;

Step S906: the source MSC Server returns a location cancelling response to the HSS/HLR and deletes CS user data stored locally;

Step S907: since the UE is in an inactive state in the source MSC Server, the source MSC server replaces the UE to perform an IMS de-registration process, and sends a SIP de-registration request to an I-CSCF, wherein said registration request includes a PVI, the PUI obtained in Step S815, and a contact address of the source MSC Server.

Taking the above user as an example, the PVI in the de-registration request is:

234150999999999@ics.mnc015.mcc234.3gppnetwork. org;

the PUI is a PUI obtained in the registration request:

Tel: +861004821437;

the contact address of the MSC Server is:

sip:sip:msc.home1.net, or sip:+861004821437@msc.home1.net;

Step S908: the I-CSCF interacts with the HSS, and sends a request of assigning an S-CSCF to the HSS to require the HSS to assign a S-CSCF serving for a user, wherein the request needs to carry the PVI and PUI;

Step S909: the HSS assigns the S-CSCF for a user which is sent to the I-CSCF by a response of assigning an S-CSCF;

step S910: the I-CSCF forwards the de-registration request to the specified S-CSCF;

Step S911: the S-CSCF matches the PVI, PUI, and the contact address of the MSC Server with the registered registration binding relationships;

During the match of the registration binding relationship, not only PVI and PUI but also the contact address information of the MSC Server are needed to be matched, viz. only if the three are all matched, the S-CSCF determines that the received de-registration request matches the existing registration binding relationship and Step S911 is to be executed; otherwise, the S-CSCF deems that the registration binding relationship to be de-registered does not exist, and sends a de-registration failure response to the MSC Server, and the process ends;

Step S912: the S-CSCF interacts with the HSS, and sends a de-registration state of a user to the HSS, wherein the request carries a PVI and PUI;

Step S913: the HSS returns a de-registration response to the S-CSCF;

Step S914: the S-CSCF returns a successful de-registration response to the I-CSCF;

Step S915: the I-CSCF forwards the successful de-registration response to the enhanced MSC Server;

Step S916: the S-CSCF triggers a de-registration process of the third party based on an initial filter criteria for user's contract data, sends a de-registration request to an AS to inform the AS that the user has been de-registered.

Step S917: the AS returns a successful de-registration response;

Step S918: the S-CSCF updates or delete the user's registration binding relationship.

From the above Example 1 and Example 2, it can be determined that when the UE moves from the source enhanced MSC Server to the target enhanced MSC Server, the target MSC Server performs an IMS registration process following Example 1, and the source MSC Server performs a de-registration process following Example 2.

Since the address of the registration request sent by the target enhanced MSC Server is a contact address of the target MSC Server, the S-CSCF fails to obtain the matched existing registration binding relationships based on the PVI, PUI, and the contact address of the target MSC Server and establishes a new registration binding relationship (PVI, PUI, and contact address of the target MSC Server) no matter whether the source registration binding relationship exist or not.

As for the de-registration process executed by the source enhanced MSC Server replacing the UE, only the source registration binding relationship can be matched by the S-CSCF based on the PVI, PUI, and the contact address of the source MSC Server, and the source registration binding relationship further be deleted, and it can be avoided that the target registration binding relationship is deleted by mistake.

Moreover, in order to simplify an operation, it can be required only in a de-registration process rather than in a registration process that a contact address is regarded as a matching condition for a de-registration operation. In this case, during a registration process of the target MSC Server, if the source registration binding relationship is not de-registered yet, the source registration binding relationship can be matched by the S-CSCF because the S-CSCF performs the match only based on the PVI and PUI, and the S-CSCF updates the source registration binding relationship into a target registration binding relationship (the PVI, PUI, and contact address of the target MSC Server); if the source registration binding relationship has been de-registered, the registration binding relationship can not be matched by the S-CSCF based on the PVI and PUI, and the S-CSCF establishes a new registration binding relationship (the PVI, PUI, and contact address of the target MSC Server). During a de-registration process of the source MSC Server, the S-CSCF performs the match based on the PVI, PUI, and contact address of the source MSC Server, if the source registration binding relationship has been updated into a target registration binding relationship, the source registration binding relationship can not be matched by the S-CSCF based on the PVI, PUI and contact address of the source MSC Server, and the S-CSCF will return the response of de-registration failure; if the source registration binding relationship has not been updated, the source registration binding relationship can be matched and then deleted, so that the case never happens that the target registration binding relationship is deleted by mistake.

Example 3

Figure 10:
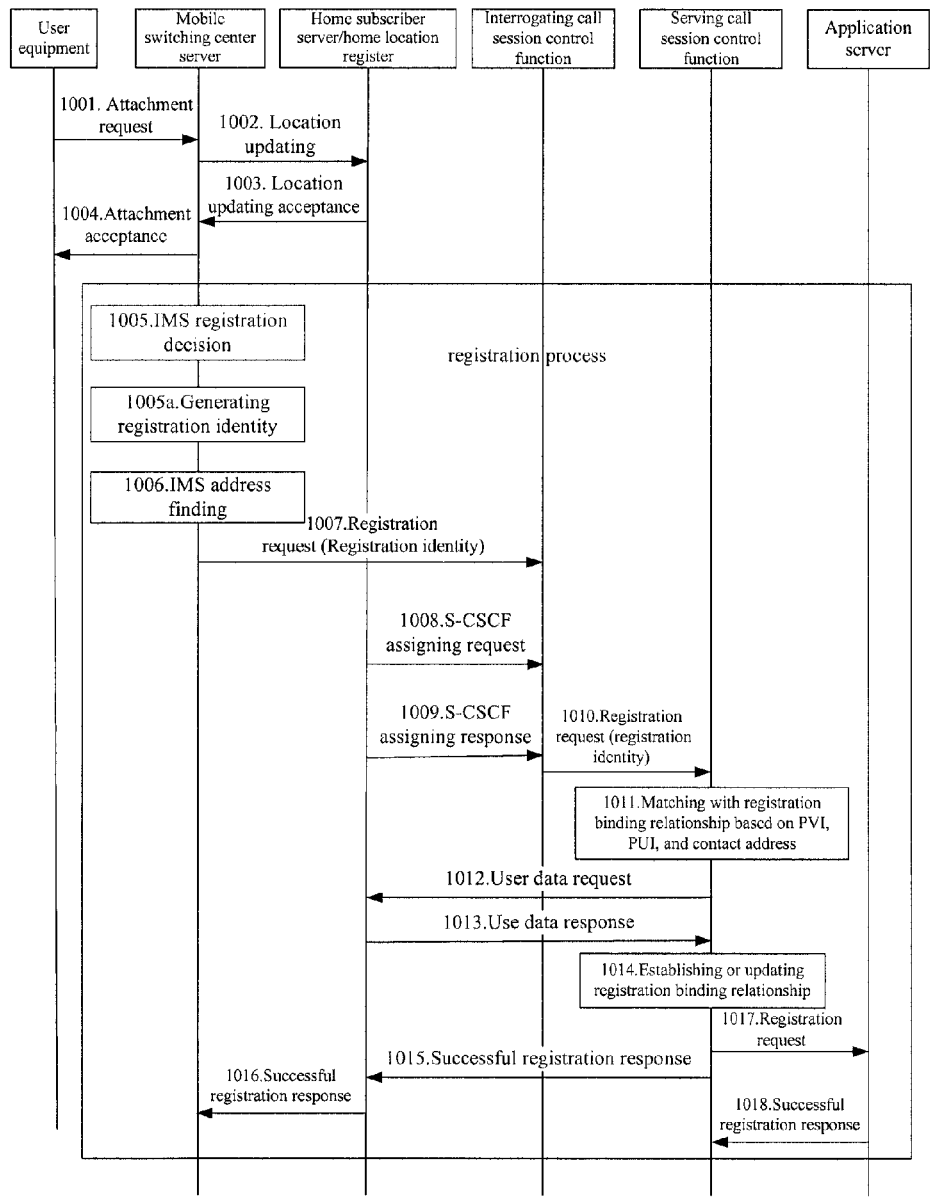
FIG. 10 is a flow chart of a specific implementing process of Example 3 of the present invention.

In said example, the enhanced MSC Server replaces the CS UE to perform a registration process. The characteristic information of the MSC Server is a MSC Server registration identity which is directly carried in a request message sent by the MSC Server rather than inserted into a PVI and carried in the request message in the form of an extended PVI. As shown in FIG. 10, the specific implementing process of the present example includes:

Step S1001 to step S1005 are the same as the above Step S801 to Step S805; and No description is made herein;

Step S1005a: the enhanced MSC Server generates a registration identity;

specifically, the enhanced MSC Server can generate a registration identity according to node information to ensure the generated registration identity to be different from a registration identity generated by other enhanced MSC Server for meeting the requirement of uniqueness of an obtained registration identity;

in a specific implementing process, the node information may be signaling node number of the enhanced MSC Server, node number, IP address, host name, etc. When generating a registration identity, the node information can be used directly as a registration identity or an specified function operation can be performed on the node information to obtain a registration identity;

for example, the node number of the MSC Server is +8610000001, and the node number can be used directly as a registration identity, or a certain function operation, e.g. a hash function operation, is performed on the node number, to obtain a unique registration identity, e.g. hash function (8610000001)= XXXXXXX;

the registration identity can be carried in reg-id defined by a protocol of draft-ietf-sip-outbound or carried by a new head field or parameter defined;

moreover, in one life cycle of registration of said UE in said enhanced MSC Server, said registration identity must remain unchanged; and the same registration identity is used in a subsequent re-registration or de-registration process;

Step S1006: the MSC Server infers from the user identity a home domain, a PVI, and a PUI of a user and finds a suitable address of an entry point, e.g. the address of the I-CSCF, etc.;

Step S1007: the MSC Server sends a SIP registration request, including a PVI, a PUI, a contact address of the MSC Server and a registration identity generated in step S1005a as well as an accessing manner indication indicating that the registration request is sent from the MSC Server;

Step S1008 to step S1010 are the same as Step S808 to Step S809 in FIG. 8;

Step S1011: the S-CSCF matches the PVI, PUI, registration identity with registered registration binding relationship;

in said example, besides the PVI and PUI, a registration identity is added as a matching condition. When the three are all matched, the S-CSCF determines that the received registration request matches the existing registration binding relationship and the existing registration binding relationship needs to be updated, otherwise an initial registration is determined and a new registration relationship is established; and Step S1012 to Step S1018 are the same as step S812 to step S818 in FIG. 8.

After executing the above process, a source registration binding relationship (a PVI, a PUI, a source MSC Server contact address, and a registration identity) is established in the S-CSCF.

Example 4

In said example, a UE moves to a target MSC Server. After the location in the target MSC Server is updated, a source MSC replaces a CS UE to perform a de-registration process.

Figure 9:
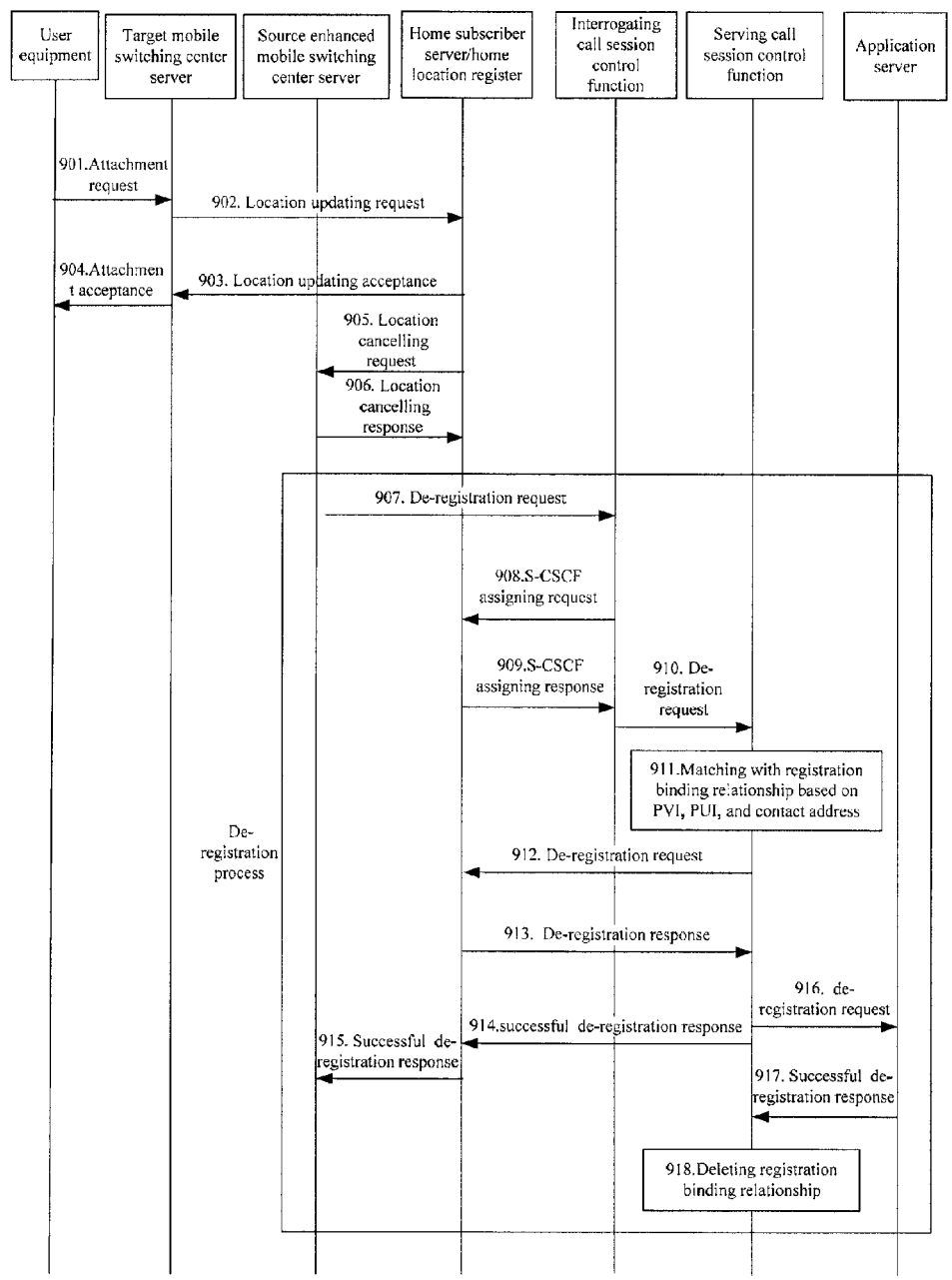
FIG. 9 is a flow chart of a specific implementing process of Example 2 of the present invention.
Figure 11:
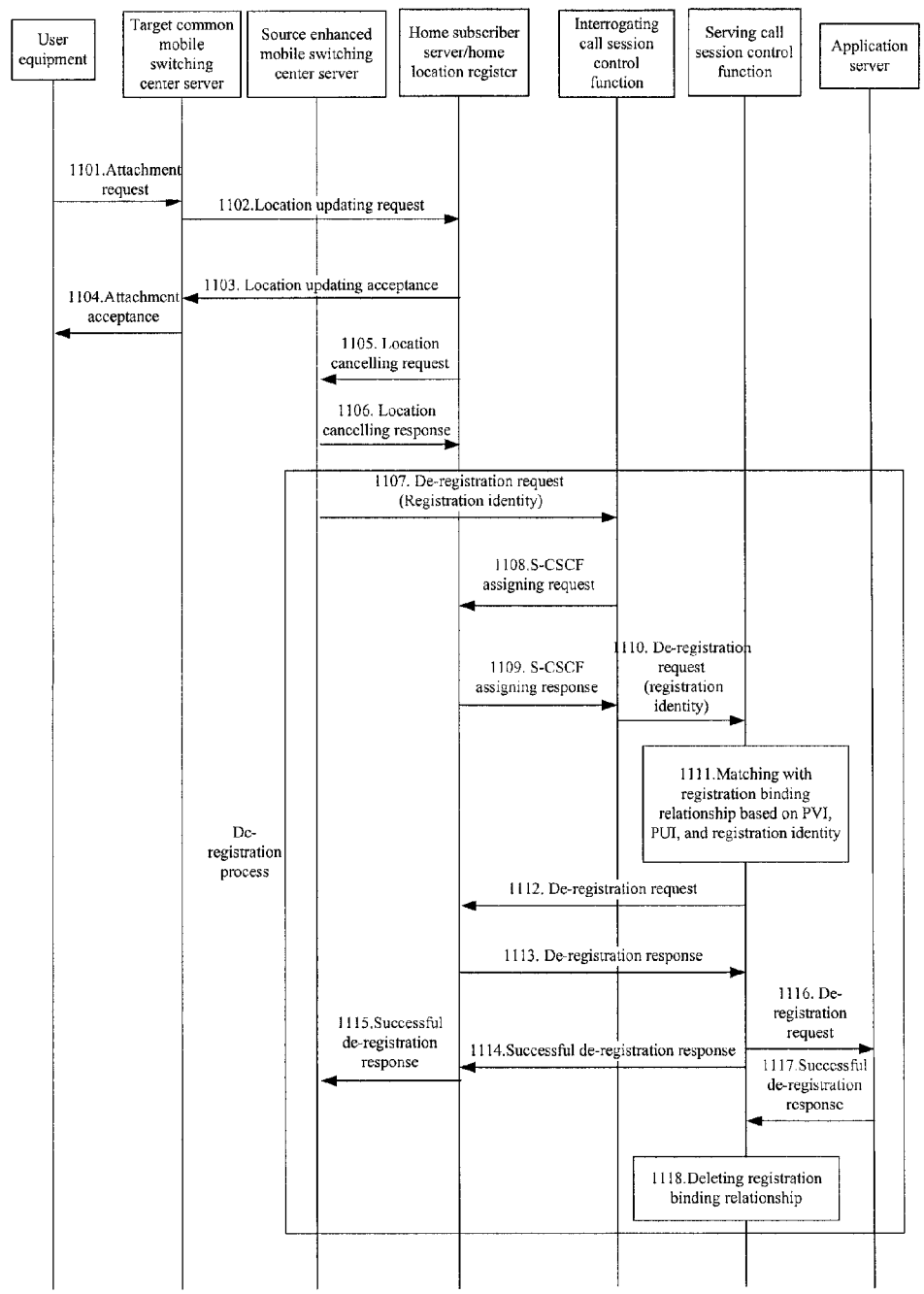
FIG. 11 is a flow chart of a specific implementing process of Example 4 of the present invention.

The characteristic information of the MSC Server is a registration identity which is present independently rather than carried in the PVI. Obviously, the process is also suitable for a case in which the UE is on longer active in an enhanced MSC Server due to other reasons, e.g. the UE is successfully detached to a source enhanced MSC Server, the UE is compulsorily detached by a network, etc. As shown in FIG. 11, the specific executing process in said example includes:

Step S1101 to Step S1106 are the same as Step S901 to Step S906;

Step S1107: the source MSC Server replaces the UE to perform an IMS de-registration process, sends a SIP de-registration request to the I-CSCF, wherein said de-registration request includes the registration identity generated in Step 1005a in FIG. 10 besides a PVI, the PUI obtained in step 315, and a contact address of the MSC Server;

Step S1108 to Step 1110 are the same as Step S908 to Step S910 in FIG. 9;

Step S1111: the S-CSCF matches the PVI, PUI, and registration identity with the registered registration binding relationships;

in the said example, besides the PVI and PUT, a registration identity is added as a matching condition; when the three are all matched, the S-CSCF determines the received de-registration request matches the existing registration binding relationship, and deletes the existing registration binding relationship, otherwise deems that the binding relationship to be de-registered does not exist, and returns a de-registration failure response to the MSC Server;

Steps S1112 to S1118 are the same as Steps S912 to S918 in FIG. 9;

following the above processes, when the UE moves from the source enhanced MSC Server to a target common MSC Server, as shown in FIG. 11, the target MSC Server only performs a circuit switched domain location updating process rather than an IMS registration process, while the source MSC Server replaces the UE to perform a de-registration process to delete the initial registration binding relationship for reflecting the movement of a user.

Based on the above Example 3 and Example 4, it can be determined that when the UE moves from the source enhanced MSC Server to the target enhanced MSC Server, the target MSC Server performs an IMS registration as shown in FIG. 10, and the source MSC Server performs a de-registration process as shown in FIG. 11. Since the two processes are performed with regard to two registration relationships, respectively, they do not affect each other, and the confusion of the registration relationships will not happen. When the UE moves between different enhanced MSC Servers, the purpose is always achieved that only the target registration binding relationship (a PVI, a PUI, and a contact address of the target MSC Server) is stored in the S-CSCF after the moving process ends.

Example 5

Figure 12:
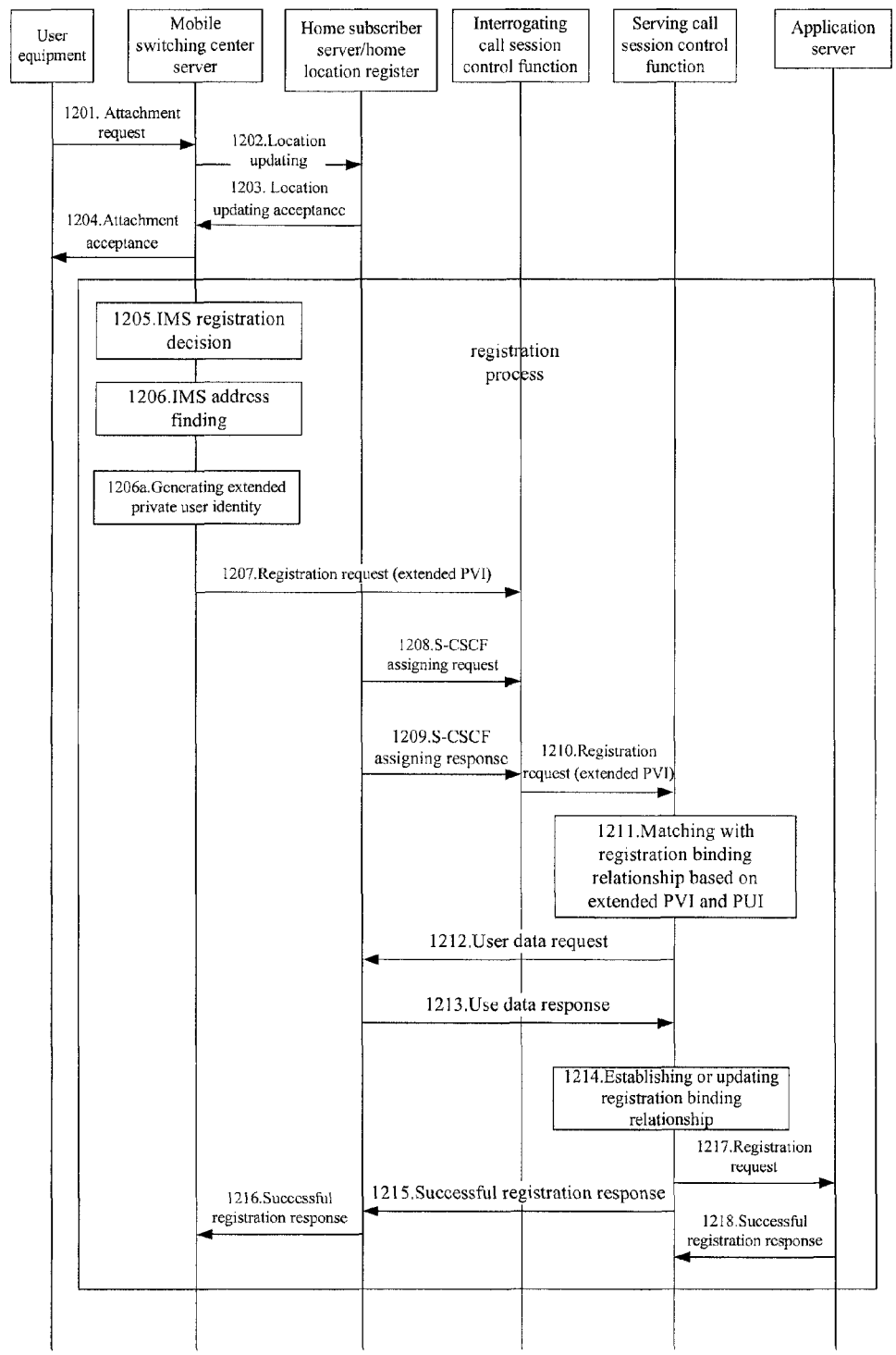
FIG. 12 is a flow chart of a specific implementing process of Example 5 of the present invention.

In said example, the enhanced MSC Server replaces the CS UE to perform a registration process. The characteristic information of the MSC Server is a registration identity of the MSC Server, and the registration identity is inserted into a PVI and carried in a request message in the form of an extended PVI. As shown in FIG. 12, the specific implementing process of said example includes:

Step S1201 to Step S1206 are the same as Step S801 to Step S806 in FIG. 8;

Step S1206a: the enhanced MSC Server generates a registration identity and inserts the registration identity into a PVI to form an extended PVI and sends a request message carrying the extended PVI to the IMS;

in a specific implementing process, the MSC Server could infer the PVI by using a user identity and determine a registration identity by node information of the MSC Server so as to obtain an extended PVI, for example, the PVI of the UE is as follows:
234150999999999@ics.mnc015.mcc234.3gppnetwork.org;
the node number is: +8610000001;
the extended PVI can be:
234150999999999@8610000001.ics.mnc015.mcc234.3gppnetwork.org;
other network entities, e.g. HSS/HLR, I-CSCF, and S-CSCF, may infer a PVI reversely from the extended PVI, for example,
deleting the node information of the MSC Server from 234150999999999@8610000001.ics.mnc015.mcc234.3gppnetwork.org to infer the PVI;

Step S1207 is almost same as step S807 in FIG. 8 except that the registration request carries the extended PVI rather than the PVI;

Step S1208 to Step S1209 are the same as Step S808 to Step S809 in FIG. 8;

since an operation of assigning the S-CDCF is executed in the HSS/HLR based on the PVI and the PUI instead of storing user configuration data by the extended PVI, therefore, the extended PVI must be converted into the PVI; and there are two methods herein:

(1) the I-CSCF receives a registration or de-registration request, and sends a S-CSCF assigning request carrying the extended PVI and the PUI to the HSS/HLR; the HSS/HLR obtains a user private identity based on the extended PVI, and then performs an S-CSCF assigning operation;

(2) the I-CSCF receives a registration or de-registration request, obtains a PVI based on the extended PVI, and sends a S-CSCF assigning request carrying the PVI and PUI to the HSS/HLR; and the HSS/HLR performs a S-CSCF assigning operation;

Step S1210 is the same as Step S810 in FIG. 8;

Step S1211: the S-CSCF matches the extended PVI and PUI with the registered registration binding relationship;

Step S1212 to Step S1213 are the same as Step S812 to Step S813 in FIG. 8;

since the PVI rather than the extended PVI is used in the HSS/HLR to store user configuration data, the extended PVI must be converted to the PVI. There are two methods herein:

(1) the S-CSCF receives a registration or de-registration request, and interacts with the HSS/HLR, wherein said request carries the extended PVI and PUI, and the HSS/HLR obtains a user private identity based on the extended PVI and performs a corresponding registration or de-registration operation;

(2) the S-CSCF receives a registration or de-registration request, obtains a user private identity based on the extended PVI, and then interacts with the HSS/HLR, wherein said request carries the PVI and PUI, and the HSS/HLR performs a corresponding registration or de-registration operation;

Step S1214 to Step S1218 are the same as Step S814 to Step S818 in FIG. 8.

after performing the above processes, a source registration binding relationship (an extended PVI, a PUI, and a contact address of the MSC Server) is established in the S-CSCF.

Example 6

Figure 13:
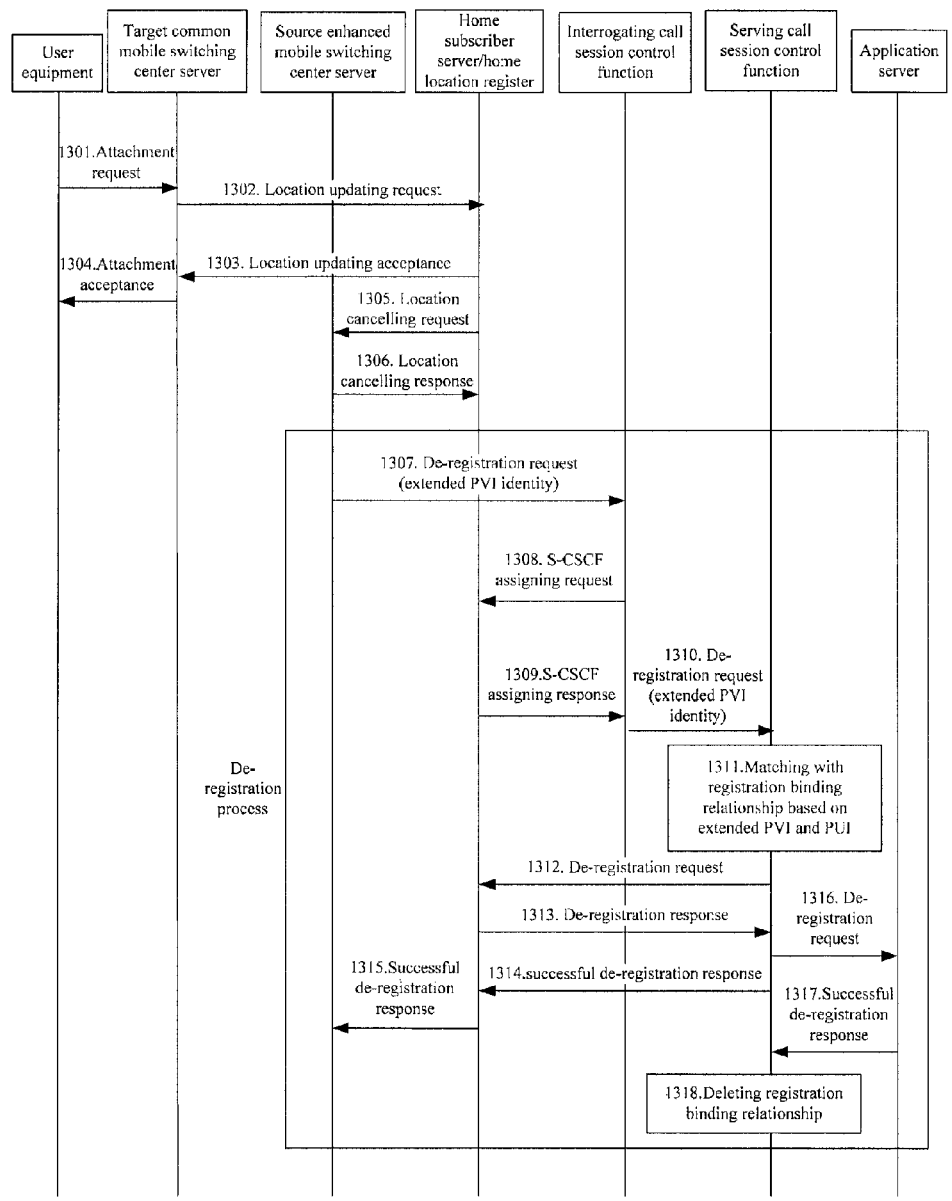
FIG. 13 is a flow chart of a specific implementing process of Example 6 of the present invention.

In said example, a UE moves to a target MSC Server. After the location in the target MSC Server is updated successfully, the source MSC Server replaces the CS UE to perform a de-registration process. The characteristic information of the MSC Server is a registration identity of the MSC Server, and the registration identity is inserted into the PVI and sent to the IMS by a request message in which the registration identity is carried in the form of an extended PVI. Obviously, said process is also suitable for the case that the UE is no longer active in the enhanced MSC Server due to other reasons, for example, the UE is successfully unattached to the source enhanced MSC Server, the UE is compulsorily de-registered by a network, etc. As shown in FIG. 13, the specific implementing process of said example includes:

Step S1301 to Step S1306 are the same as Step S901 to Step S906 in FIG. 9;

Step S1307: since the UE is in an inactive state in the source MSC Server, the source MSC Server replaces the UE to perform an IMS de-registration process, and sends a SIP de-registration request to the I-CSCF, wherein said de-registration request carries the extended PVI obtained in Step S1206a, PUI and the contact address of the source MSC Server;

Step S1308 to Step S1309 are almost same as Step S908 to Step S909 in FIG. 9 only except that the I-CSCF or HSS/HLR needs to obtain the PVI from the extended PVI;

Step S1310: the I-CSCF forwards the de-registration request to a designated S-CSCF, said de-registration request carrying the extended PVI;

Step S1311: the S-CSCF matches the extended PVI and PUI with the registered registration binding relationship;

Step S1312 to Step S1313 are almost same as Step S912 and Step S913 in FIG. 9 except that in the interaction of the S-CSCF with the HSS/HLR, the S-CSCF or HSS/HLR is required to obtain the PVI from the extended PVI;

Step S1314 to Step S1318 are the same as Step S914 to Step S918 in FIG. 9.

by applying the above processes, when the UE moves from the source enhanced MSC Server to a target common MSC Server, the target MSC Server only performs a circuit switched domain location updating process rather than an IMS registration process, while the source MSC Server replaces the UE to perform a de-registration process by using the extended PVI and deletes the source registration binding relationship (an extended PVI, a PUI, and a contact address of the source MSC Server) for reflecting movement of a user.

As described above, a registration matching relationship of an IMS registration mechanism is changed by means of the present invention, such that different enhanced MSC Servers generate different registration binding relationships when replacing the UE to initiate a registration, so as to prevent the chaos in the operation of the registration binding relationship during a movement of the UE, and ensure logical normality of the IMS registration service and make the service processed normally. Moreover, the examples of the present invention only change a registration flow initiated by the MSC Server replacing the UE rather than a registration flow initiated by a non-MSC Server, thereby possessing good compatibility.

Obviously, the person skilled in the art shall understand that the respective modules or respective steps of the present invention as mentioned above can be realized by a conventional computing apparatus, which can be integrated into a single computing apparatus or distributed over a network composed of multiple computing apparatuses. Preferably, they can be realized by a program code executable by the computing apparatus, therefore, they can be stored in a storage apparatus to be executed by the computing apparatus, or they are manufactured into respective integrated circuit modules, respectively, or multiple modules or steps thereof are manufactured into a single integrated circuit module. In this way, the present invention is not limited to any specific combination of hardware and software.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the scope of protection of the present invention.

What is claimed is:

1. A method for realizing an IMS registration mechanism of an IP multimedia subsystem, applied to a network environment of a CS User Equipment (CS UE), an Enhanced Mobile Switching Center Server (MSC Server), and an IMS, wherein when the MSC Server replaces the CS UE to send a registration or de-registration request to the IMS, the method comprises:
   a Serving Call Session Control Function (S-CSCF) of the IMS obtaining a private user identity and a public user identity of the CS UE and characteristic information of the MSC Server from a received request message, wherein the request message includes a registration request or a de-registration request;
   the S-CSCF matching the obtained private user identity, public user identity, and characteristic information with existing registration binding relationships; and
   performing an operation indicated by the request message on the successfully matched registration binding relationship, if the match is successful.

2. The method according to claim 1, wherein, the characteristic information includes: a contact address of the MSC Server.

3. The method according to claim 2, wherein, if the request message is a registration request, the S-CSCF matches the obtained private user identity and the public user identity with the existing registration binding relationships.

4. The method according to claim 1, wherein, the characteristic information includes a registration identity.

5. The method according to claim 4, wherein, before the S-CSCF obtains the private user identity and the public user identity of the CS UE and the characteristic information of the MSC Server from the received request message, the method further includes:
   the MSC Server generating and storing the registration identity, and making the registration identity to be carried in the request message and sending the request message to the S-CSCF via an Interrogating CSCF (I-CSCF) of the IMS.

6. The method according to claim 5, wherein, the request message is a registration request; and
   the operation of performing the operation indicated by the request message on the successfully matched registration binding relationship is specifically as follows: the S-CSCF performing a re-registration process and updating the successfully matched registration binding relationship; or
   if the match is unsuccessful, the S-CSCF performs an initial registration process and establishes a registration binding relationship including the registration identity.

7. The method according to claim 4, wherein, the registration identity is carried in the private user identity;
   before the S-CSCF obtains the private user identity and the public user identity of the CS UE and the characteristic information of the MSC Server from the received request message, the method further includes:
   the MSC Server generating the registration identity and inserting the registration identity into the private user identity; and
   the MSC Server making the public user identity and the private user identity into which the registration identity is inserted to be carried in the request message and sending the request message to the S-CSCF via an I-CSCF of the IMS.

8. The method according to claim 7, wherein, the request message is a registration request;
   the operation of performing the operation indicated by the request message on the successfully matched registration binding relationship is specifically as follows: the S-CSCF performing a re-registration process and updating the successfully matched registration binding relationship; or
   if the match is unsuccessful, the S-CSCF performs an initial registration process and establishes a registration binding relationship including the private user identity carrying the registration identity.

9. The method according to claim 5, wherein, the step of the MSC Server generating the registration identity includes specifically:
   the MSC Server setting its node information as the registration identity; or
   the MSC Server calculating its node information by a predetermined algorithm to obtain the registration identity.

10. A Serving Call Session Control Function (S-CSCF), comprising:
    an obtaining module, configured to obtain, from the request message received, a private user identity and a pubic user identity of CS UE as an initiation side and characteristic information of a MSC Server which replaces the CS UE to send a request message to said S-CSCF, wherein the request message includes: a registration request or a de-registration request;
    a matching module, configured to match the private user identity, the public user identity, and the characteristic information obtained by the obtaining module with existing registration binding relationships; and
    an executing module, configured to perform an operation indicated by the request message based on the matching result of the matching module.

11. A MSC Server, comprising:
    a deciding module, configured to determine whether to replace a CS UE to perform an IMS registration or de-registration;
    a setting module, configured to make a registration identity of the MSC Server to be carried in a request message sent to an IMS, after the deciding module determines to replace the CS UE to perform the IMS registration or de-registration; and
    a sending module, configured to send the request message set by the setting module.

12. A system for realizing an IMS registration mechanism, the system comprising a MSC Server, and an I-CSCF and a S-CSCF of an IMS, wherein,
    the MSC Server is configured to replace CS UE to send a request message to the IMS system, wherein the request message carries a private user identity and a public user identity of the CS UE, and characteristic information of the MSC Server; and
    the S-CSCF is configured to receive the request message sent by the I-CSCF and matching the PVI, the PUI, and the characteristic information carried in the request message with existing registration binding relationships, wherein if the match is successful, an operation indicated by the request message is performed on the matched registration binding relationship.

13. The system according to claim 12, wherein,
the S-CSCF is further configured to perform an initial registration process and establish a registration binding relationship including the characteristic information if the match is unsuccessful and the request is a registration request.

14. The method according to claim 2, wherein, the characteristic information includes a registration identity.

15. The method according to claim 6, wherein, the step of the MSC Server generating the registration identity includes specifically:
   the MSC Server setting its node information as the registration identity; or
   the MSC Server calculating its node information by a predetermined algorithm to obtain the registration identity.

16. The method according to claim 7, wherein, the step of the MSC Server generating the registration identity includes specifically:
   the MSC Server setting its node information as the registration identity; or
   the MSC Server calculating its node information by a predetermined algorithm to obtain the registration identity.

17. The method according to claim 8, wherein, the step of the MSC Server generating the registration identity includes specifically:
   the MSC Server setting its node information as the registration identity; or
   the MSC Server calculating its node information by a predetermined algorithm to obtain the registration identity.

* * * * *